Figure 1:
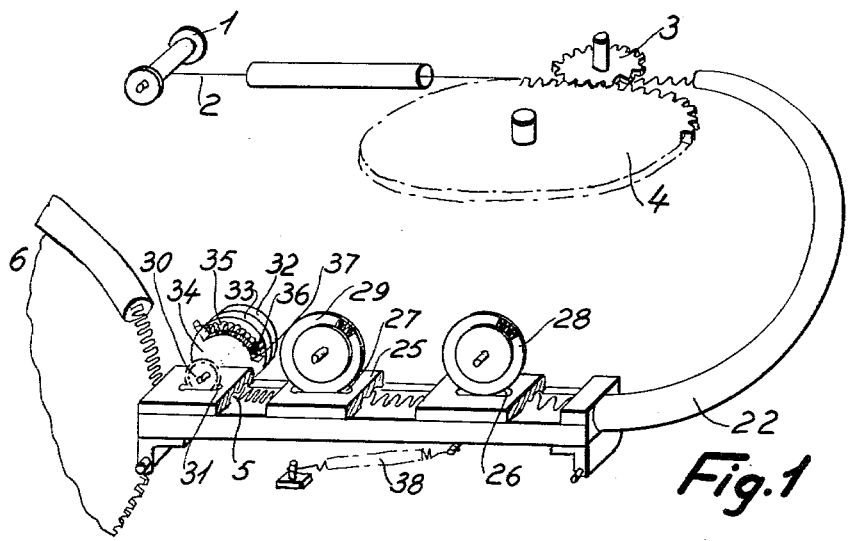

July 27, 1965　　　　　H. HANSEN　　　　3,197,537
APPARATUS AND METHOD FOR MANUFACTURING SLIDE FASTENERS
Filed Sept. 18, 1961　　　　　　　　　　　2 Sheets-Sheet 1

INVENTOR
Harry Hansen

BY Watson, Cole, Grindle & Watson
ATTORNEYS

July 27, 1965   H. HANSEN   3,197,537
APPARATUS AND METHOD FOR MANUFACTURING SLIDE FASTENERS
Filed Sept. 18, 1961   2 Sheets-Sheet 2

INVENTOR
Harry Hansen
BY Watson, Cole, Grindle & Watson
ATTORNEYS

3,197,537
Patented July 27, 1965

3,197,537
APPARATUS AND METHOD FOR MANUFACTURING SLIDE FASTENERS
Harry Hansen, 14 Hoffdingsvej, Valby-Copenhagen, Denmark
Filed Sept. 18, 1961, Ser. No. 138,832
Claims priority, application Denmark, Nov. 8, 1960, 4,403
10 Claims. (Cl. 264—287)

This invention relates to a row of coupling links for slide fasteners consisting of a continuous filament bent into a twisted serpentine form with alternate loops having their closed ends directed in opposite directions, the loops in one direction forming the coupling links and having their flank portions lying close together, these loops being transversely disposed relative to the middle plane of the row, the loops in the other direction forming connections between the coupling links and having their flank portions spaced from one another, these loops extending in twisted positions from one side of the row to the other.

A row of coupling links of this type may be constructed in such a manner that a good and reliable engagement with a counter row of coupling links of the same construction is obtained, because the loops forming the coupling links are completely non-resilient in the direction of engagement, i.e. in the longitudinal direction of the row of coupling links. Thus, in this respect, the row of coupling links is on principle not inferior to a row of coupling links of the classical type consisting of individual elements because the twisted loops form connections of some stiffness from coupling link to coupling link.

It is the object of the invention to devise simple ways of modifying the shape of a row of coupling links of the type in question so as to combine a reliable engagement with a similar counter row of coupling links with a flexibility of the row of coupling links greater than that of the previously known rows of coupling links of the type referred to. With this object in view, according to the invention, the end portions of the loops in both directions are flattened in the axial direction of the loops to form heads having a smaller thickness but a greater width than the filament.

These flattened heads form engaging elements at one end of the loops serving as coupling links while the flattened heads of other end form resilient connecting portions of high flexiblity from coupling link to coupling link, whereby the flexibility of the row of coupling links as a whole is improved.

The invention also relates to a method of making a row of coupling links of the kind referred to. The principal feature of this method is that a continuous filament is first formed into zigzag shape comprising a series of flank portions located in a common plane and connected alternatingly at one and the other end by means of flattened end portions having a smaller thickness (as measured in the said plane) but a greater width (as measured perpendicularly to the said plane) than the filament, whereafter successive pairs of said flank portions are moved into successive tooth spaces of a toothed coiling jig in positions one outside the other and lying close together, the said coiling jig being so constructed as to permit the end portion between the flank portion present in the outer position in one tooth space and the flank portion present in the inner position in the next following tooth space to extend around the lateral end face of the tooth separating the two tooth spaces in question.

The advantage of this method is that very simple and reliable mechanical means may be used for the production because the said steps do not require the employment of means executing complicated movements or cooperating in complicated ways. As a matter of fact, as will be apparent from the following, the method may be carried out by means of operating parts all having a continuously progressing rotary motion. Owing to the provision of the flattened heads of the loops forming connections between the coupling links, a flexibility of these portions of the filament is obtained such that these portions without having to be guided, will automatically assume the required twisted position when the loops forming the coupling links successively move into position in successive tooth spaces of the coiling jig.

According to the invention, the flank portions of the zigzag shaped filament may advantageously be pressed closely together before being introduced into the tooth spaces of the coiling jig. In this manner the flank portions may be moved into the tooth spaces of the coiling jig more rapidly and reliably than if the pressing together of the flank portions were to take place only at the same time as their introduction into the tooth spaces.

The pressing together of the flank portions of the zigzag shaped filament may, according to the invention, advantageously be effected during the feeding movement of the zigzag shaped filament by subjecting the latter to a brushing action at a speed higher than the feeding speed of the part of the zigzag shaped filament that has not yet been subjected to the brushing action. By this brushing action all problems regarding synchronization of the feeding movement with the other functions of the machine, and also all problems regarding the establishment of a correct engagement between the flank portions and the feeding means are circumvented. Such an engagement would be difficult to establish because the flank portions cannot be relied on to occupy precisely defined mutual positions until they have been pressed close together in direct contact with one another. However, after they have been so pressed together, positively engaging toothed means may preferably be used in the final stage of moving successive pairs of flank portions into the tooth spaces of the coiling jig.

The invention finally also relates to a machine for carrying out the method referred to. The main characteristic of the machine according to the invention is that it comprises cooperating toothed members for pressing a continuous filament into zigzag shape with flattened end portions, a flat guideway for receiving and guiding the zigzag shaped filament, means for feeding the zigzag shaped filament forward in the flat guideway, and at the same time pressing the flank portions thereof towards one another, and a toothed coiling jig located at the outlet end of the flat guideway and movable transversely of the principal plane of the flat guideway, the said coiling jig being so constructed that the width of the tooth spaces substantially corresponds to the thickness of the filament, and the length of the teeth is smaller than the distance between the flattened end portions at one and the other end respectively of the flank portions of the zigzag shaped filament.

Figure 2:
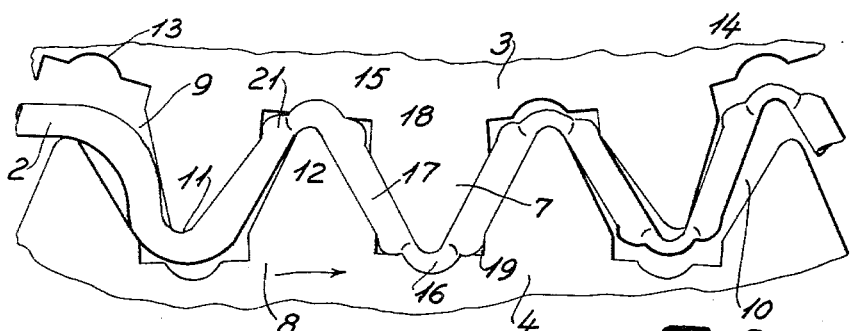
Figure 3:
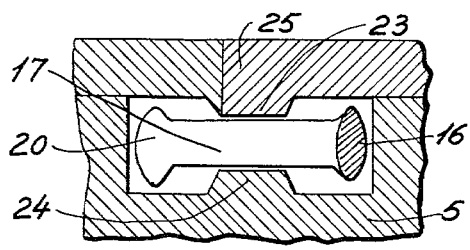
Figure 4:
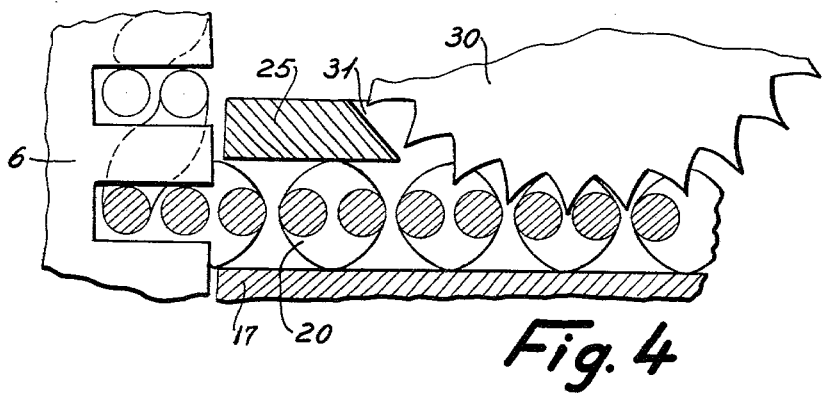
Figure 5:
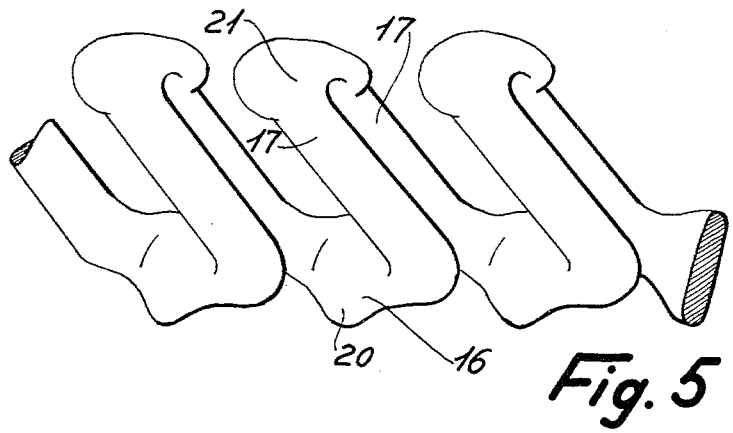

Further features of the invention will be apparent to those skilled in the art from the following detailed description of one embodiment of the invention, reference being made to the accompanying drawings, in which FIG. 1 is a perspective view of the essential parts of a machine according to one embodiment of the invention, FIG. 2 is a section on an enlarged scale through two cooperating gear wheels forming part of the machine, and also showing a filament being subjected to a first shaping operation by means of the said gear wheels, FIG. 3 is a cross section through a guideway forming part of the machine, and a zigzag shaped filament received therein, FIG. 4 illustrates the guideway of FIG. 3, and a coiling jig in the form of a gear wheel mounted in front of the outlet end of the guideway, the whole being shown in vertical section through the guideway and the filament structure being treated, the gear wheel itself being fragmentarily shown in elevation, and FIG. 5 a perspective view of a fragment of a finished row of coupling links made by means of the machine illustrated in FIGURES 1–4.

The row of coupling links herein referred to is made from a continuous filament, e.g. a circular cross section filament of superpolyamide or another suitable thermoplastic material. The configuration of the row of coupling links will best be understood by studying the shaping operations to which the filament is subjected in being transformed from a smooth continuous rectilinear element to a finished row of coupling links. These shaping operations will therefore first be described with reference to FIGURES 1–4.

In FIG. 1, 1 is a bobbin from which a continuous filament 2, e.g. of superpolyamide is drawn off. Briefly stated, the filament 2 first passes between the gear wheels 3 and 4 in which it is pressed up into zigzag shape, and in this shape it proceeds to a flat guideway 5 in which it is longitudinally compressed in such a manner that the flank portions of the zigzag loops will lie close together whereafter, at the outlet end of the guideway 5, the flank portions are pushed two by two into successive tooth spaces of a coiling jig in the form of a gear wheel 6.

The configuration of the gear wheels 3 and 4 is illustrated in detail in FIG. 2. From this figure it will be apparent that each of the gear wheels has substantially triangular teeth 7 and 8, respectively, with intervening triangular tooth spaces 9 and 10 respectively, it being observed, however, that the spaces of the teeth are rounded at 11 and 12 respectively, and the bottoms of the tooth spaces are similarly rounded at 13 and 14 respectively. The configuration and the mutual positions of the gear wheels are so selected that in the position of cooperation between a tooth 7 and 8 respectively of one gear wheel and the corresponding tooth space 10 and 9 respectively of the other gear wheel, the distance between the apex of the tooth and the bottom of the tooth space is smaller than the distance between the cooperating tooth flanks of one and the other gear wheel respectively, the latter distance being substantially equal to the thickness of the filament. Consequently, when the filament 2 is fed forward between the gear wheels and is thus pressed up into zigzag shape, the end portions 15 and 16 at both ends of the flank portions 17 are flattened while the flank portions 17 are not subjected to any such deformation. The material that is displaced by the flattening of the end portions 15 will partly flow out transversely of the plane of the zigzag line formed by the filament, and partly flow into pockets 18 and 19, respectively, extending laterally from the tooth spaces adjacent the bottoms thereof. The material flowing out transversely will form heads 20, FIGS. 3, 4 and 5, at both ends of the zigzag loops while the material flowing into the pockets 18 and 19 will form reinforcing shoulders 21.

From the gear wheels 3 and 4 the zigzag shaped filament passes through a guide tube 22 to the flat guideway which has an inner cross section of a configuration to receive the flat zigzag shaped filament with a small clearance, longitudinal projections 23 and 24 being provided in the middle to form guides for the flank portions while the height of the cross section on both sides of these projections is sufficiently great to receive the flattened and widened heads. In the top wall 25 of the guideway 5 two openings 26 and 27 are provided through which revolving brushes 28 and 29 respectively engage the zigzag shaped filament so as to feed this forward in the passage by a brushing action. Both brushes 28 and 29 have circumferential speeds exceeding the speed at which the zigzag shaped filament leaves the gear wheels 3 and 4. Consequently, the brushes, while feeding forward the zigzag shaped filament, will at the same time compress the latter longitudinally so as to bring the flank portions closer together. In the embodiment shown, where two brushes are provided, the flank portions are thereby pressed closely together in a two stage operation.

In this closely packed position the flank portions are caught by the teeth of a gear wheel 30 which projects through an opening 31 in the top wall 25 of the guideway 5 adjacent the outlet end thereof. The teeth of the gear wheel 30 are sharp edged and are located at a spacing corresponding to the spacing of the centers of the cross sections of the closely packed flank portions. The gear wheel 30 serves to move successive pairs of flank portions lying close together into successive tooth spaces of the gear wheel 6, and for this purpose the gear wheel 30 is driven by means of a combined slip and spring clutch which is diagrammatically represented in FIG. 1 by three coupling discs, 32, 33 and 34 of which the coupling discs 32 and 33 are frictionally coupled to each other while the coupling discs 33 and 34 are coupled to each other by means of a circumferentially extending helical spring 35. A pin 36 mounted on the coupling disc 33 engages in a notch 37 of the coupling disc 34 so that the latter is rotatable within certain limits relative to the coupling disc 33 with consequent tenisoning and relaxation of the spring 35. The coupling disc 32 forms the driving coupling part and is driven by means, not shown, at a speed of rotation higher than the speed of rotation of the gear wheel 30 required for introducing successive pairs of flank portions into the tooth spaces of the gear wheel 6 as these tooth spaces successively arrive in position in front of the outlet end of the guideway. When a tooth is present in front of the outlet end of the guideway, thus blocking this outlet end, the gear wheel 30 and consequently the coupling disc 34 are prevented from rotating, and the spring 35 will therefore first be tensioned until the pin 36 strikes the end wall of the notch 37, whereby the coupling disc 33, too, is prevented from rotating, whereafter the coupling disc 32 starts sliding relative to the coupling disc 33. As soon as a tooth space of the gear wheel 6 has arrived in position in front of the outlet end of the guideway, the blocking of the said outlet end ceases, and the frontmost two flank portions are now suddenly moved into the said tooth space under the influence of the feeding action of the gear wheel 30 in conjunction with their own spring force resulting from their being pressed close together. At the first moment of this movement of the flank portions into the tooth space, the spring 35 will cause the coupling disc 34 and thereby the gear wheel 30 to perform a sudden movement in the feeding direction whereby the introduction of the flank portions into the tooth space is accelerated, and at the same time the coupling disc 32 begins to drive the coupling disc 33 because the gear wheel 30 is no longer blocked. When the two flank portions have been introduced into the tooth space, this is not capable of receiving further flank portions and the feeding of the zigzag shaped filament is hereby again blocked so that the coupling disc 33 again tensions the spring 34 and is then itself blocked whereupon the coupling disc 32 again starts sliding relative to the coupling disc 33.

The tooth spaces of the gear wheel 6 have a width (as measured in the circumferential direction) substantially corresponding to the thickness of the flank portions, i.e. the diameter of the original filament, so that two flank portions lying close together will find a good support and guidance in the tooth space. The teeth have a length (as measured transversely of the gear wheel) somewhat greater than the distance between the flattened heads at one and the other end respectively of the flank portions, Hereby the flank portions are held in their longitudinal direction because the heads will overhang the lateral end faces of the tooth.

Owing to the continuous movement of the gear wheel 6 in conjunction with the introduction of successive pairs of flank portions into the tooth spaces, as these successively come into position in front of the outlet end of the flat guideway, each end portion of the zigzag filament connecting a flank portion present in one tooth space with a flank portion present in the next following tooth space will be caused to assume a twisted position around one lateral end face of the tooth of the gear wheel 6 separating the two tooth spaced considered. These twisted end portions 16 will all be located at the same side of the gear wheel 6 while at the other side of the latter the two flank portions present in each tooth space are directly connected with each other through a flattened untwisted end portion 15.

In this manner a row of coupling links is formed which consists of loops having their flank portions lying close together and being transversely disposed relative to the middle plane of the row (as represented by a diametrical plane of the gear wheel 6) and being provided with flattened heads at one end while being connected at their other end through loops in the opposite direction, these loops (at 16) extending in twisted positions relative to the middle plane of the row of coupling links and being likewise constructed with flattened heads, the whole forming a distorted helical structure.

The configuration of the finished row of coupling links is illustrated in FIG. 5.

Preferably the row of coupling links referred to is made from a thermoplastic material such as superpolyamide and in such case the row of coupling links should preferably be stabilized in its shape by heating and subsequent cooling. This may be obtained by arranging heating means in suitable zones of the path of the filament through the machine while in other zones cooling by dissipation to the environment is permitted to take place. Hereby a non-uniform thermal expansion of different parts of the machine may occur, to which due regard has to be paid in the design and dimensioning of the machine. A particularly important point is to keep a very accurate and a very small distance between the outlet end of the flat guideway 5 and the teeth of the gear wheel 6. As illustrated in FIG. 1, this may be obtained by arranging for the flat passage to be urged against the gear wheel 6 under the influence of a spring 38.

I claim:

1. A method of making a row of coupling links for slide fasteners, comprising the steps of first continuously and progressively forming a filament into a planar zig-zag structure with the flank portions thereof lying close together, and then successively and progressively displacing the pair of flank portions which at any time form the frontmost pair of said planar structure out of the plane thereof, and feeding the next following pair of flank portions forward in the plane of said structure to the position previously occupied by said displaced pair of flank portions.

2. A method of making a row of coupling links for slide fasteners, comprising the steps of continuously and progressively forming a filament into a planar zig-zag structure, feeding said planar zig-zag structure forward in a substantially rectilinear path and at the same time gradually compressing the flank portions thereof to closely packed positions, successively and progressively displacing the pair of flank portions which at any time form the frontmost pair of said planar structure bodily out of the plane thereof in a direction substantially perpendicular to said plane, and feeding the next following pair of flank portions forward in the plane of said structure to the position previously occupied by said displaced pair of flank portions.

3. A method of making a row of coupling links for slide fasteners, comprising the steps of continuously and progressively forming a filament into a planar zig-zag structure, subjecting said zig-zag structure to a brushing action to feed same forward in a substantially rectilinear path and at the same time gradually compressing the flank portions thereof to closely packed positions, successively and progressively displacing the pair of flank portions which at any time form the frontmost pair of said planar structure out of the plane thereof, and feeding the next following pair of flank portions forward in the plane of said structure to the position previously occupied by said displaced pair of flank portions.

4. A machine for making a row of coupling links for slide fasteners comprising a flat passage for receiving and guiding a zig-zag shaped filament, said flat passage having an inlet end and an outlet end, intermeshing toothed members for pressing a continuous filament into zig-zag shape and feeding the zig-zag structure thus formed forward to the inlet end of said flat passage, means for feeding the zig-zag shaped filament forward in the flat passage and at the same time compressing the flank portions thereof towards one another, a toothed coiling jig located at the outlet end of the flat passage and movable transversely of the principal plane thereof, the said coiling jig being so constructed that the width of the tooth intervals substantially corresponds to the thickness of the filament, and the length of the teeth is smaller than the distance between the end portions at one and the other end respectively of the flank portions of the zig-zag shaped filament, while the depth of said tooth intervals is sufficient for receiving two flank portions lying close together one outside the other, means for moving said coiling jig so as to successively bring the tooth intervals thereof in position flush with the outlet end of the said flat passage, and means for feeding successive pairs of flank portions into successive tooth intervals of said coiling jig.

5. A machine for making a row of coupling links for slide fasteners comprising a flat passage for receiving and guiding a zig-zag shaped filament, said passage having an inlet end and an outlet end, intermeshing tooth members for pressing a continuous filament into zig-zag shape and feeding the zig-zag shaped filament thus formed forward to the inlet end of said passage, said flat passage being provided in one of its flat sides with at least one opening, at least one revolving brush mounted for engagement through said opening with a zig-zag shaped filament in said flat passage, means for rotating said revolving brush at a peripheral speed higher than the speed at which the zig-zag shaped filament is received at the inlet end of said flat passage, a toothed coiling jig located at the outlet end of the flat passage and movable transversely of the principal plane thereof, the said coiling jig being so constructed that the width of the tooth intervals substantially corresponds to the thickness of the filament, and the length of the teeth is smaller than the distance between the end portions at one and the other end respectively of the flank portions of the zig-zag shaped filament, while the depth of said tooth intervals is sufficient for receiving two flank portions lying close together one outside the other, means for moving said coiling jig so as to successively bring the tooth intervals thereof in position flush with the outlet end of the said flat passage, and means for feeding successive pairs of flank portions into successive tooth intervals of said coiling jig.

6. A machine as in claim 5, in which said flat passage is provided adjacent its outlet end in one of its flat sides with an additional opening, a feeding gear wheel being mounted for engagement through said additional opening with the flank portions of a zig-zag shaped filament present in said flat passage and having its flank portions located close together.

7. A machine as in claim 6 in which the feeding gear wheel is driven through a combined slip and spring clutch tending to impart to said gear wheel a feeding speed higher than that at which the coiling jig is capable of receiving the flank portions of the filament, the coiling jig being continuously driven.

8. A machine as in claim 4 in which the flat guideway is urged towards the coiling jig by spring action.

9. A machine as in claim 4 in which the cooperating toothed members for pressing the filament into zig-zag shape with flattened end portions consist of two gear wheels, the teeth and tooth spaces of which are shaped substantially as zig-zag lines with rounded apexes and in such mutual positions that the distance between the top of a tooth of one gear wheel and the bottom of the tooth space of the other gear wheel with which it cooperates is smaller than the distance between cooperating tooth flanks of one and the other gear wheel respectively.

10. A machine as in claim 9 in which the tooth spaces are constructed with pockets extending laterally therefrom at a short distance from their bottoms.

References Cited by the Examiner

UNITED STATES PATENTS

| | | | |
|---|---|---|---|
| 1,111,418 | 9/14 | Wadsworth | 18 |
| 1,678,941 | 7/28 | Helman | 140—105 XR |
| 2,071,603 | 2/37 | Winter Halter | 18—59 |
| 2,153,936 | 4/39 | Owens et al. | 140—105 XR |
| 2,169,178 | 8/39 | Sundback | 18—59 |
| 2,183,169 | 12/39 | Prentice | 29—410 |
| 2,541,728 | 2/51 | Wahl | 18—5 |
| 2,907,066 | 3/54 | Wahl | 18—1 |
| 2,729,078 | 1/56 | Schmidt | 64—27 |
| 2,778,385 | 1/57 | Gier | 140—105 XR |
| 2,868,236 | 1/59 | Smith | 140—105 XR |
| 2,903,745 | 9/59 | Hansen | 18 |
| 2,919,482 | 1/60 | Casson | 26—205.13 |
| 2,939,192 | 6/60 | Hansen | 26—205.13 |
| 3,054,149 | 9/62 | Streicher | 264 |

ROBERT F. WHITE, *Primary Examiner.*

ABRAHAM G. STONE, MORRIS LIEBMAN, ALEXANDER H. BRODMERKEL, *Examiners.*